United States Patent
Hirose et al.

(10) Patent No.: US 8,678,476 B2
(45) Date of Patent: Mar. 25, 2014

(54) SHOCK ABSORBER ASSEMBLY

(71) Applicants: Toyota Boshoku Kabushiki Kaisha, Aichi-ken (JP); Hayashi Telempu Co., Ltd., Aichi-ken (JP)

(72) Inventors: Fumitaka Hirose, Kariya (JP); Yoshiaki Maesoba, Kariya (JP); Kazumi Kojima, Nisshin (JP); Eiji Fujii, Okazaki (JP); Isao Yamanaka, Yokosuka (JP); Hiroyuki Ishida, Nagoya (JP)

(73) Assignees: Toyota Boshoku Kabushiki Kaisha, Aichi-Ken (JP); Hayashi Telempu Co., Ltd., Aichi (JP)

( * ) Notice: Subject to any disclaimer, the term of this patent is extended or adjusted under 35 U.S.C. 154(b) by 0 days.

(21) Appl. No.: 13/692,208

(22) Filed: Dec. 3, 2012

(65) Prior Publication Data

US 2013/0147172 A1   Jun. 13, 2013

(30) Foreign Application Priority Data

Dec. 9, 2011   (JP) ................................. 2011-270333

(51) Int. Cl.
*B60R 21/04* (2006.01)

(52) U.S. Cl.
USPC ................................. 296/187.05; 296/187.12

(58) Field of Classification Search
USPC .................. 296/146.6, 146.5, 146.8, 56, 189, 296/146.7, 187.12; 293/102, 120
See application file for complete search history.

(56) References Cited

U.S. PATENT DOCUMENTS

| | | | | |
|---|---|---|---|---|
| 4,890,877 A | * | 1/1990 | Ashtiani-Zarandi et al. | ........................... 296/146.7 |
| 5,306,066 A | * | 4/1994 | Saathoff | .................... 296/146.6 |
| 6,203,096 B1 | * | 3/2001 | Noda et al. | ................. 296/146.6 |

FOREIGN PATENT DOCUMENTS

JP   08-67140   3/1996

OTHER PUBLICATIONS

U.S. Appl. No. 13/692,181 to Fumitaka Hirose et al., filed Dec. 3, 2012.

* cited by examiner

*Primary Examiner* — Joseph Pape
*Assistant Examiner* — Dana Ivey
(74) *Attorney, Agent, or Firm* — Greenblum & Bernstein, P.L.C.

(57) ABSTRACT

A shock absorber assembly includes a shock absorber, a utility part, and a flexible member. The shock absorber is provided to a vehicular interior part that is mounted on a compartment inner side of a body panel, and the shock absorber includes a mounting portion that is mounted to a compartment outer side surface of the vehicular interior part. The utility part is provided to the vehicular interior part. The flexible member covers a peripheral surface of the shock absorber, and a part of the flexible member is held by the vehicular interior part and the utility part to support and mount the shock absorber to the vehicular interior part.

15 Claims, 6 Drawing Sheets

SHOCK ABSORBER ASSEMBLY

CROSS REFERENCE TO RELATED APPLICATION

This application claims priority from Japanese Patent Application No. 2011-270333 filed on Dec. 9, 2011. The entire contents of the priority application are incorporated herein by reference.

FIELD OF THE INVENTION

The present disclosure relates to a shock absorber assembly.

BACKGROUND OF THE INVENTION

A shock absorber is provided to vehicular interior part such as a vehicular door trim. The shock absorber protects a passenger if a side collision occurs and a load is applied to the vehicular interior part. An example of such a shock absorber is arranged in a position corresponding to a passenger's thigh. If a load is applied to the vehicle from a compartment outer side, the shock absorber is deformed by the passenger's thigh and this absorbs shock that might be given to the passenger.

However, in the configuration that the shock absorber is provided to the vehicular interior part, the shock absorber is subjected to stress if a load is applied to the vehicular interior part or the shock absorber. Such a stress is likely to be concentrated on a vicinity of a mounting portion of the shock absorber that is mounted to the vehicular interior part. Therefore, if a load is applied to the vehicular interior part, the vicinity of the mounting portion may be deformed or a part of which may be broken. Accordingly, the shock absorber may be moved from a correct mounting position. Namely, the shock absorber may be shifted from an appropriate position that corresponds to the passenger's thigh.

SUMMARY OF THE INVENTION

The present invention has been made in view of the aforementioned circumstances. An objective of the present invention is to provide a shock absorber assembly that maintains a shock absorber in an appropriate position with respect to a passenger's thigh without deteriorating a shock absorbing property of the shock absorber.

A technology described herein relates to a shock absorber assembly including a shock absorber, a utility part and a flexible member. The shock absorber is provided to a vehicular interior part that is mounted on a compartment inner side of a body panel, and the shock absorber includes a mounting portion that is mounted to a compartment outer side surface of the vehicular interior part. The utility part is provided to the vehicular interior part. The flexible member covers a peripheral surface of the shock absorber, and a part of the flexible member is held by the vehicular interior part and the utility part to support and mount the shock absorber to the vehicular interior part.

DETAILED DESCRIPTION OF THE PREFERRED EMBODIMENTS

Figure 1:
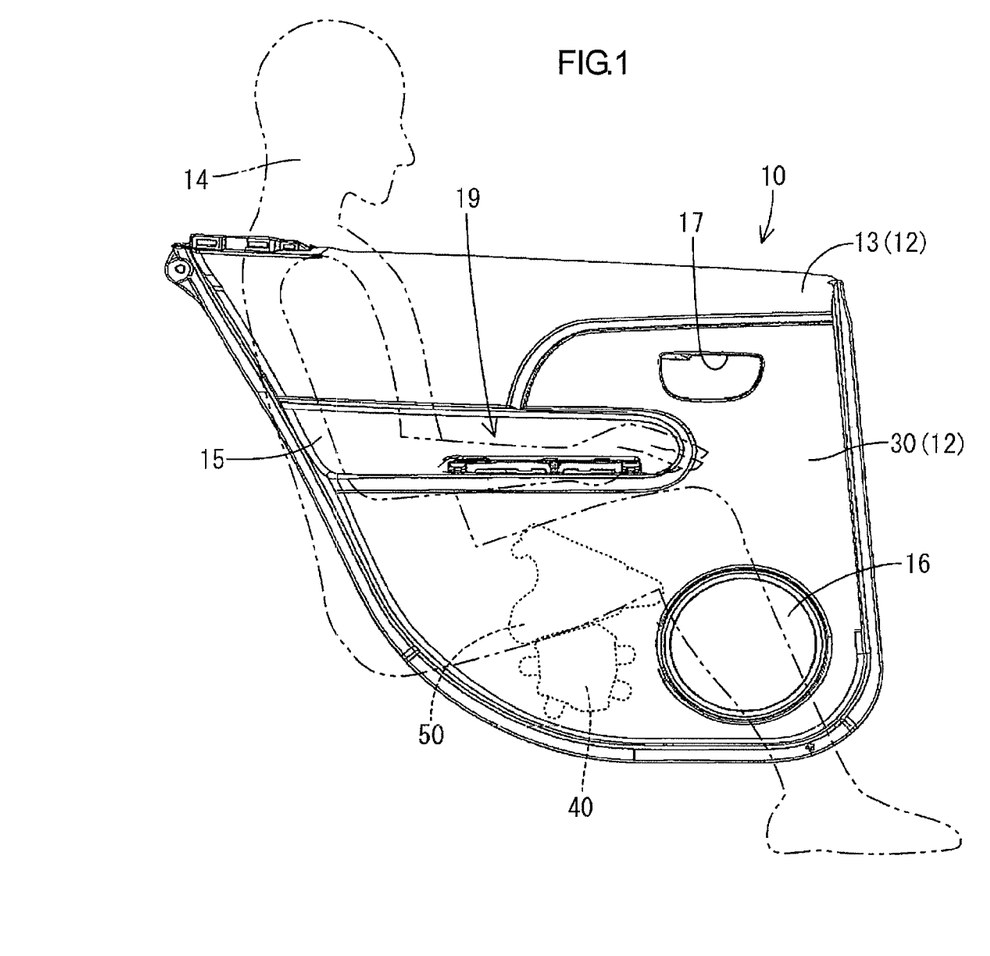
FIG. 1 is a front view illustrating a door trim according to one embodiment.

One embodiment will be explained with reference to FIGS. 1 to 6. As illustrated in FIG. 1, a door trim 10 (a vehicular door trim, a vehicular interior part) is mounted on a compartment inner side of a door inner panel 11 (see FIG. 5) that configures a vehicular door panel (a vehicular body panel), and accordingly a vehicular door is configured with the door trim 10 and the door inner panel 11.

As illustrated in FIG. 1, the door trim 10 is mainly configured with a trim board 12 and an ornament 15 that is mounted to the trim board 12. The trim board 20 is configured with a synthetic resin material such as polypropylene. The trim board is not necessarily formed of a synthetic resin material but may be formed of a material obtained by mixing a wood-based material and a synthetic resin. The trim board 12 includes an upper board 13 and a lower board 30. The upper board 13 configures an upper portion of the trim board 12 and the lower board 30 configures a lower portion of the trim board 12. A skin is adhered to the trim board 12 to cover a surface of the trim board 12.

The lower board 30 includes a speaker grill 16 and an inside handle housing portion 17. The ornament 15 is provided between the upper board 13 and the lower board 30. The door trim 10 includes an armrest 19 that is projected to the compartment inner side.

Figure 2:
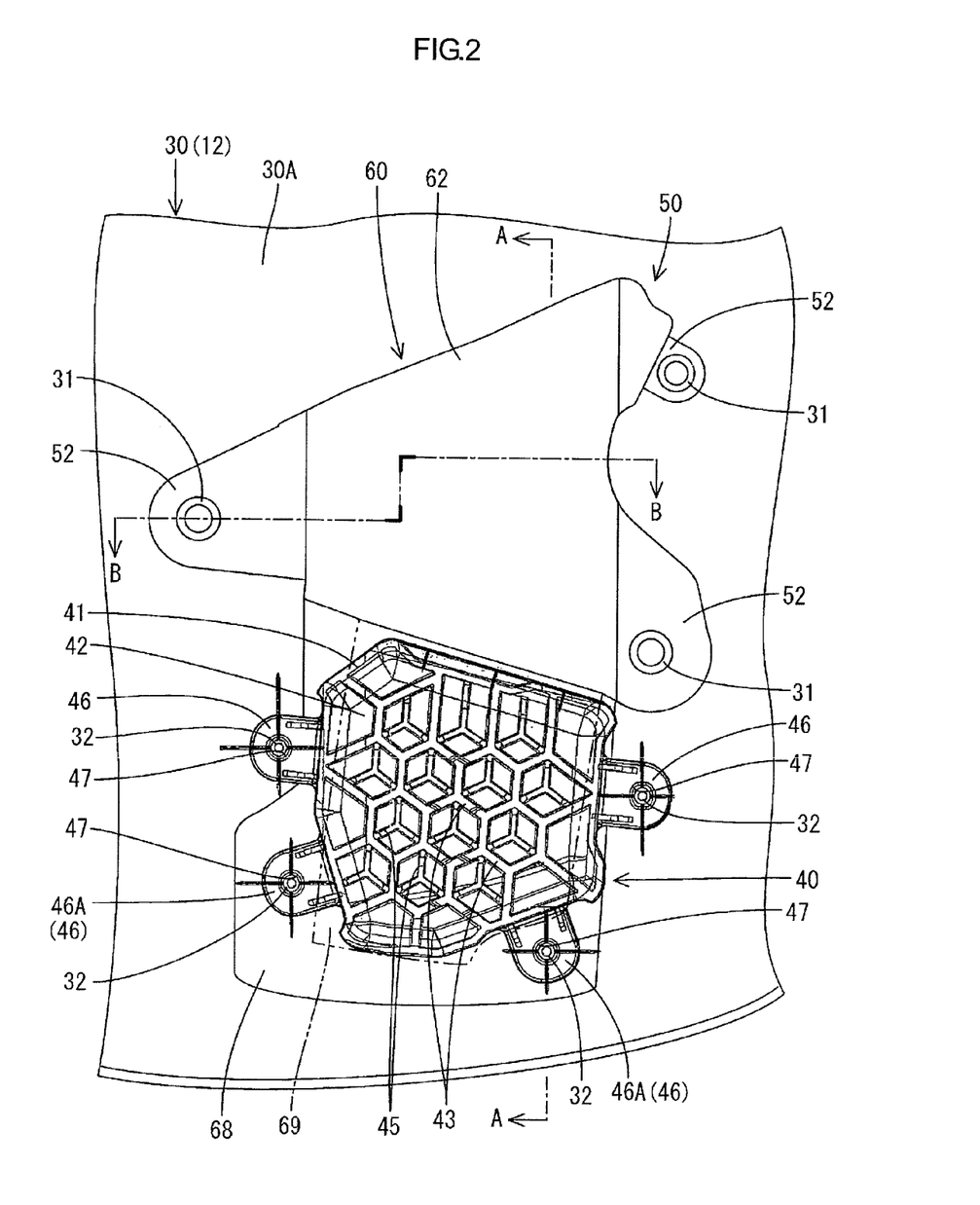
FIG. 2 is an enlarged view illustrating a shock absorber pad and a spacer on a back surface of a door trim.

As illustrated in FIGS. 1 and 2, a shock absorber pad 50 is attached to a compartment outer side surface 30A of the lower board 30. A spacer 40 is provided below the shock absorber pad 50 on the compartment outer side surface 30A of the lower board 30. The spacer 40 is provided in adjacent to the shock absorber pad 50. The shock absorber pad 50 and the spacer 40 are provided in a space between the door inner panel 11 and the lower board 30. In FIG. 1, the shock absorber pad 50 and the spacer 40 are illustrated by a dotted line.

As illustrated in FIG. 1, the shock absorber pad 50 (a shock absorber) is arranged to correspond to a passenger's 14 thigh. The shock absorber pad 50 is configured with a hard foam material obtained by foaming a synthetic resin material such as polypropylene containing urethane or a foaming agent to have a volume of several times (for example, approximately fifteen to forty five times) of an original volume. The shock absorber 50 is mounted to a vehicular door to absorb collision energy that may be caused in case that a side of the vehicle is impacted by another object (a side collision). The shock absorber pad 50 may be called an EA (energy absorption) member.

Figure 4:
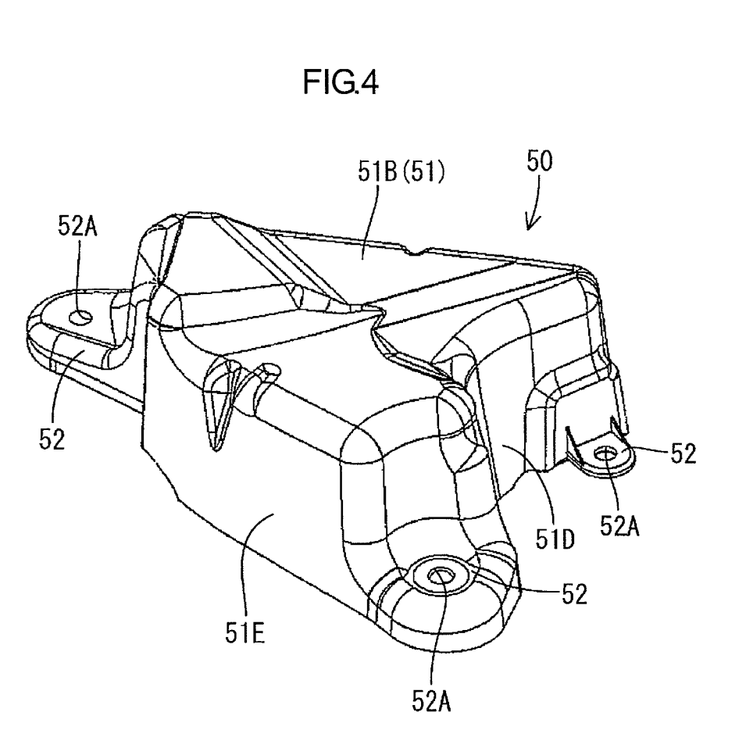
FIG. 4 is a perspective view illustrating the shock absorber pad.

As illustrated in FIGS. 2 and 4, the shock absorber pad 50 includes a pad main body 51 and a plurality of mounting portions 52 that are formed at peripheral end portions in adjacent to corner portions of the pad main body 51. The pad main body 51 is formed in substantially a triangle seen from the compartment outer side. Three mounting portions 52 are formed at the corner portions of the pad main body 51 in this embodiment. The mounting portions 52 are directly mounted to the compartment outer side surface 30A of the lower board 30A. Thus, the shock absorber pad 50 is attached directly to the compartment outer side surface 30A of the lower board 30 at the mounting portions 52.

Figure 6:
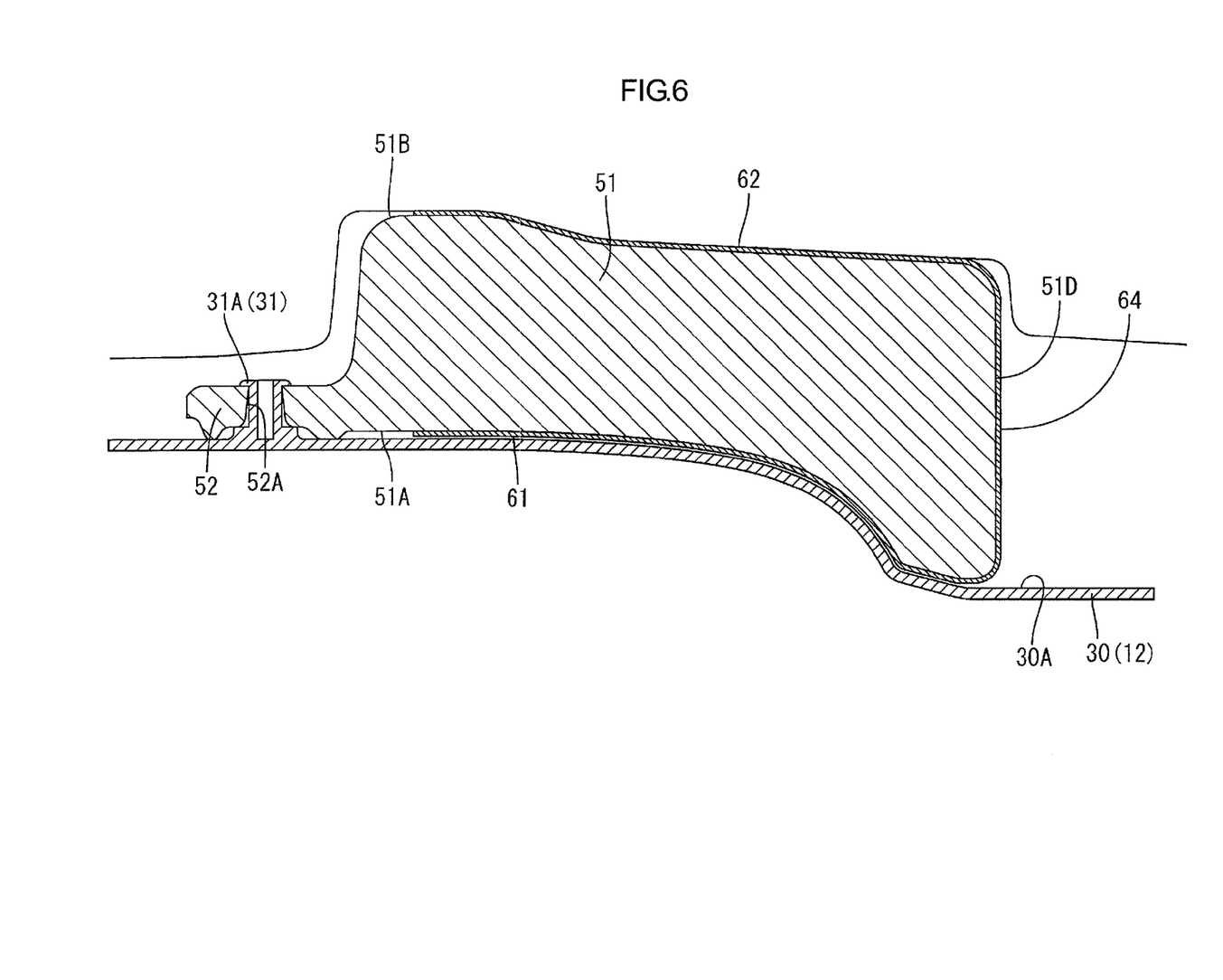
FIG. 6 is a cross-sectional view illustrating the door trim in FIG. 2 taken along a B-B line.

As illustrated in FIGS. 2 and 4, an insertion hole 52A is formed through each of the mounting portions 52. As illustrated in FIGS. 2 and 6, mounting bosses 31 project from the compartment outer side surface 30A of the lower board 30 toward the compartment outer side and each of the mounting bosses 31 is inserted through the corresponding insertion hole 52A. A tip end portion 31A of the mounting boss 31 that is inserted through the insertion hole 52A is welded with welding method such as a welding method using a ultrasonic wave. Accordingly, the tip end portion 31A of the mounting boss 31 is stopped by a peripheral edge of the insertion hole 52A from the compartment outer side and the shock absorber pad 50 is attached directly to the lower board 30.

Figure 3:
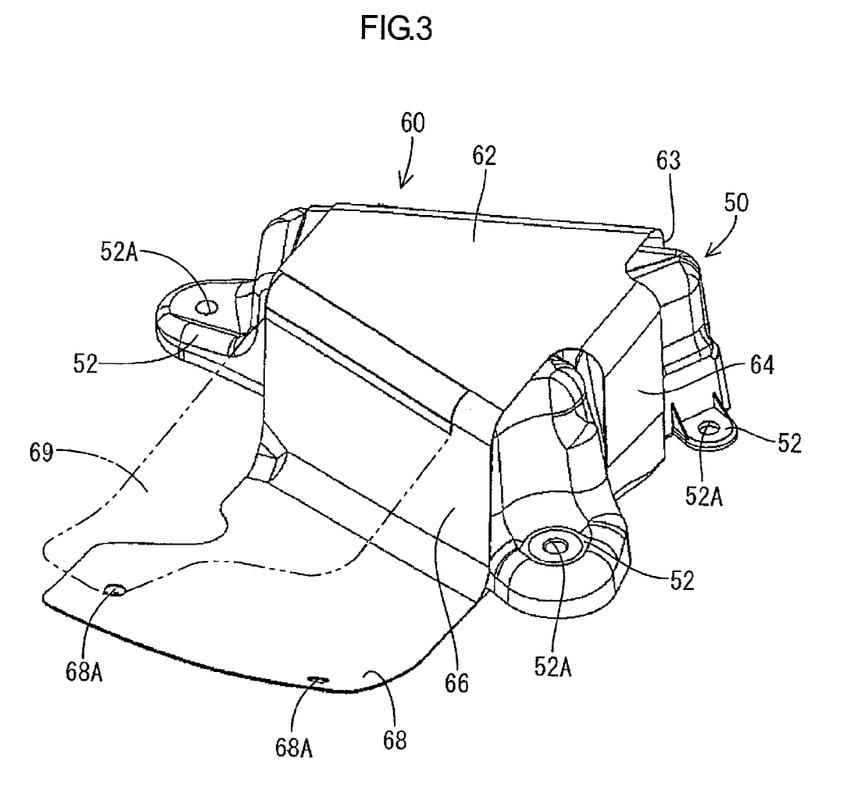
FIG. 3 is a perspective view illustrating the shock absorber pad and a flexible member.

As illustrated in FIGS. 2 and 3, in the present embodiment, the pad main body 51 is covered with a sheet-like flexible member 60. The shock absorber pad 50 is attached indirectly to the lower board 30 via the flexible member 60. A configuration of the flexible member 60 will be explained later.

Figure 5:
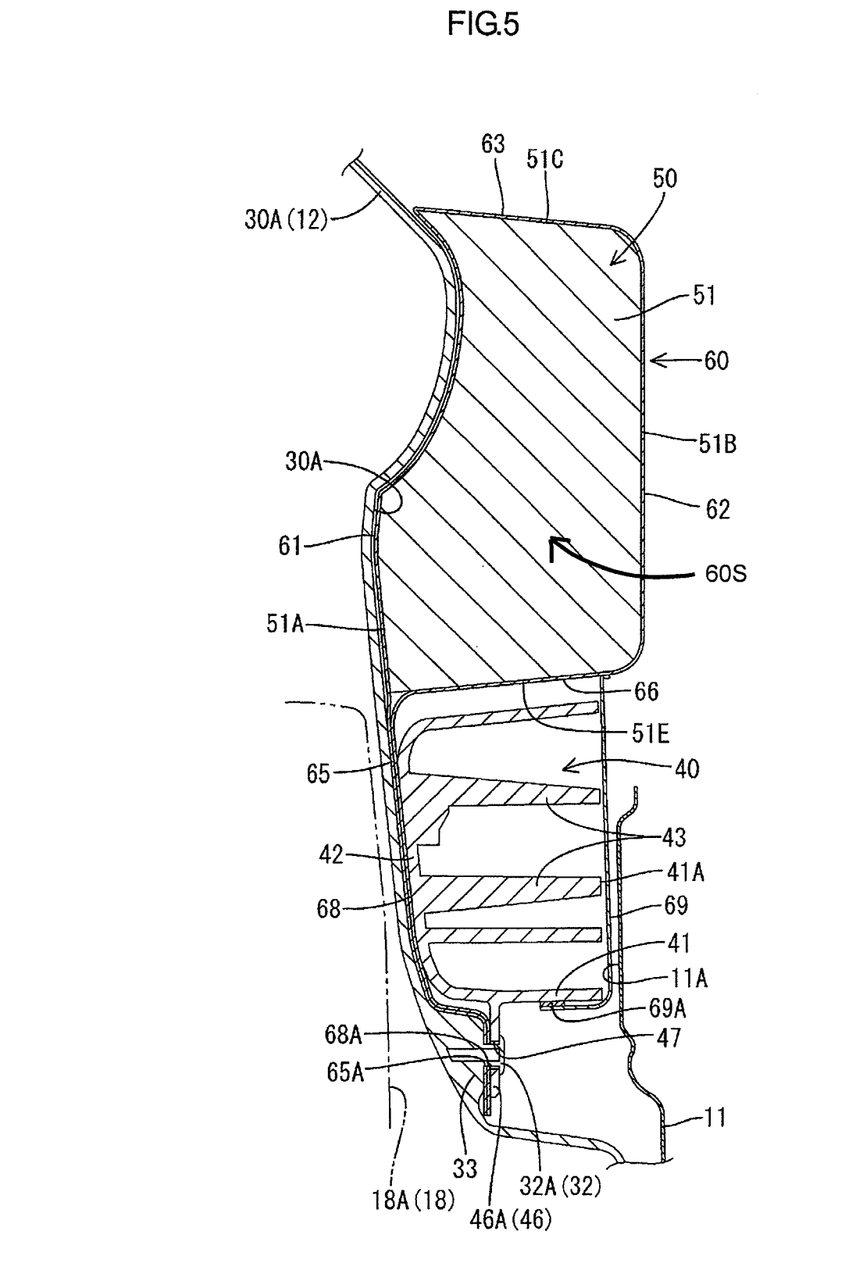
FIG. 5 is a cross-sectional view illustrating the door trim in FIG. 2 taken along an A-A line.

The spacer 40 (a utility part) is formed of a synthetic resin material. As illustrated in FIGS. 2 and 5, the spacer 40 includes a spacer main body 41 and a plurality of mounting portions 46 (utility part mounting portions) that are provided at peripheral portions of the spacer main body 41. Four mounting portions 46 are provided at the peripheral end portions of the space main body 41 in the present embodiment. The spacer 40 is attached to the compartment outer side surface 30A of the lower board 30 at the mounting portions 46.

As illustrated in FIGS. 2 and 5, an insertion hole 47 is formed through each of the mounting portions 46. Projection bosses 32 project from the compartment outer side surface 30A of the lower board 30 toward the compartment outer side (the right side in FIG. 5). Each of the projection bosses 32 is inserted through the corresponding insertion hole 47. A tip end portion 32A of the projection boss 32 that is inserted through the insertion hole 47 is welded with welding method such as a welding method using an ultrasonic wave. Accordingly, the tip end portion 32A of the projection boss 32 is stopped by a peripheral edge of the insertion hole 47 from the compartment outer side and the spacer 40 is attached to the lower board 30.

The spacer main body 41 includes a bottom wall 42 that is provided to face the lower board 30 and a plurality of reinforcing ribs 43 that extend from the bottom wall toward the compartment outer side. Most of the reinforcing ribs 43 configure a regular hexagon grid seen from the compartment outer side and configure a honeycomb structure. On the bottom wall 42, a plurality of reinforcing ribs 43 form a polygonal shape seen from the compartment outer side as illustrated in FIG. 2, and three reinforcing ribs 45 are formed in a space in the polygonal shape formed by the reinforcing ribs 43. The three reinforcing ribs 45 are provided radially at 120-degree intervals, as illustrated in FIG. 2. With this configuration, the spacer 40 includes a plurality of reinforcing ribs 43, 45 and has high rigidity.

As illustrated in FIG. 5, the spacer 40 is provided between the door inner panel 11 and the lower board 30. The spacer 40 is provided to face a side surface 18A of a seat 18 (illustrated by a two dot chain line in FIG. 5) that is mounted in the compartment. With this configuration, in case of a side collision, the bottom wall 42 of the spacer 40 presses the side surface 18A of the seat 18 via the lower board 30.

Accordingly, the load caused by the side collision is transferred to the seat 18 via the spacer 40 and the trim board 12 is less likely to be deformed toward the compartment inner side. This protects a passenger. A member having high rigidity such as a pipe configuring the seat is embedded inside of the seat 18. With this configuration, the seat 18 surely receives the load caused in case of a side collision.

Next, a mounting mechanism of the shock absorber pad 50 will be explained. In the mounting mechanism, the shock absorber pad 50 is mounted to the trim board 12 (the lower board 30) using the flexible member 60. The flexible member 60 is formed of a fabric that is formed in a sheet and has flexibility and a low stretch property. Such a flexible member 60 may be formed of a material that is used for a vehicular air bag.

The flexible member 60 is arranged to substantially cover an entire peripheral surface of the pad main body 51 of the shock absorber pad 50. As illustrated in FIGS. 3 and 5, the pad main body 51 of the shock absorber pad 50 includes a peripheral surface that includes a compartment inner side surface 51A, a compartment outer surface 51B, an upper surface 51C, a side surface 51D and a lower surface 51E. As also shown, the flexible member 60 is provided to wrap the pad main body 51 and mainly cover the surfaces of the pad main body 51 facing the compartment inner side and the compartment outer side. One end of the flexible member 60 (a compartment inner side extended portion 65) is folded to overlap another end of the flexible member 60 (a compartment outer side extended portion 68). In such an overlapped state, the flexible member 60 is fixed to the lower board 30. Namely, the flexible member 60 is formed in a closed loop as illustrated in FIG. 5. The sheet-like flexible member 60 is folded and defines a folded space 60S is formed in the folded flexible member 60. The pad main body 51 is provided in the space.

As illustrated in FIGS. 3 and 5, the flexible member 60 mainly includes a compartment inner side cover portion 61 and a compartment outer side cover portion 62. The compartment inner side cover portion 61 is provided between the pad main body 51 and the lower board 30 and covers the compartment inner side surface 51A of the pad main body 51. The compartment outer side cover portion 62 is provided to cover the compartment outer surface 51B of the pad main body 51. Thus, substantially a whole of the pad main body 51 is covered with the flexible member 60.

As illustrated in FIG. 5, an upper surface cover portion 63 is provided to cover the upper surface 51C of the pad main body 51 and the upper surface cover portion 63 connects the compartment inner side cover portion 61 and the compartment outer side cover portion 62, as illustrated in FIG. 5. Namely, the compartment outer side cover portion 62 is folded at the upper cover portion 63 to be provided on an opposite side from the compartment inner side cover portion 61. A side cover portion 64 is provided to cover the side surface 51D of the pad main body 51, and the side cover portion 64 connects the compartment inner side cover portion 61 and the compartment outer side cover portion 62, as illustrated in FIGS. 3 and 6. The pad main body 51 is formed in substantially a triangular prism shape having two surfaces (the compartment inner side surface 51A and the compartment outer side surface 51B) and three surfaces (the upper surface 51C, the side surface 51D, the lower surface 51E) connecting the two surfaces. The pad main body 51 may be formed in any prism shape.

As illustrated in FIG. 5, the compartment inner side extended portion 65 extends downwardly from a lower end (an end portion close to the spacer 40) of the compartment inner side cover portion 61. A lower surface cover portion 66 extends from a lower end of the compartment outer side cover portion 62 so as to cover a lower surface 51E of the pad main body 51.

As illustrated in FIGS. 3 and 5, the compartment outer side extended portion 68 extends downwardly from an end portion of the lower surface cover portion 66 on the compartment inner side so as to cover the compartment inner side extended portion 65 from the compartment outer side (the right side in FIG. 5). Namely, the compartment inner side extended portion 65 and the compartment outer side extended portion 68 overlap each other. The compartment inner side extended portion 65 and the compartment outer side extended portion 68 (a part of the flexible portion) are provided to follow the compartment outer side surface 30A of the loser board 30 and sandwiched and held by the lower board 30 and the bottom wall 42 of the spacer 40.

As illustrated in FIG. 5, the lower end portions of the compartment inner side extended portion 65 and the compartment outer side extended portion 68 extend along a step portion 33 formed on the compartment outer side surface 30A. As illustrated in FIGS. 2 and 5, the spacer 40 is arranged such that two of the mounting portions 46 of the spacer 40 cover the lower end portion (the extended end portion) of the compartment outer side extended portion 68 from the compartment outer side. The two mounting portions 46A (utility part mounting portion) overlap the lower end portion of the compartment outer side extended portion 68.

As illustrated in FIGS. 3 and 5, each of the compartment inner side extended portion 65 and the compartment outer side extended portion 68 (the flexible portion mounting portion) has an insertion hole 65A, 68A (a flexible member insertion hole), respectively corresponding to each insertion hole 47 (a utility part insertion hole) of the mounting portion 46A. A boss 32 is inserted through each of the insertion holes 65A, 68A.

As illustrated in FIG. 5, the boss 32 is inserted through the insertion hole 65A of the compartment inner side extended portion 65, the insertion hole 68A of the compartment outer side extended portion 68A, and the insertion hole 47 of the mounting portion 46A in this order from the compartment inner side. Thereafter, a distal end portion 32A is welded (thermal welding). Thus, the distal end portion 32A of the boss 32 is fixed to the mounting portion 46A with welding. Accordingly, the compartment inner side extended portion 65 and the compartment outer side extended portion 68 are sandwiched and held by the mounting portion 46A and the lower board 30 (the step portion 33).

In the present embodiment, the compartment inner side extended portion 65 and the compartment outer side extended portion 68 of the flexible member 60 are provided on the compartment outer side surface 30A of the lower board 30. With this configuration, the shock absorber pad 50 is attached indirectly to the lower board 30 via the flexible member 60 and this ensures a mounting position of the shock absorber pad 50. Thus, the pad main body 51 is supported by the flexible member 60 and indirectly mounted to the lower board 30 via the flexible member 60.

As illustrated in FIGS. 3 and 5, an extended cover portion 69 extends downwardly from an end portion of the lower surface cover portion 66 that is close to the compartment outer side cover portion 62 (close to the compartment outer side, the right side in FIG. 5). As illustrated in FIGS. 2 and 5, the extended cover portion 69 covers the spacer main body 41 from the compartment outer side. The extended cover portion 69 is illustrated by a two-dot chain line in FIGS. 2 and 3. The extended cover portion 69 is connected to the lower cover portion 66 by sewing with a thread. The extended cover portion 69 may be formed integrally with the lower surface cover portion 66.

As illustrated in FIG. 5, the extended cover portion 69 is provided between the compartment inner side surface 11A (a surface on the left side in FIG. 5) and the compartment outer side surface 41A of the spacer main body 41. An extended end portion of the extended cover portion 69 extends to cover the spacer main boy 41 from the lower side and is fixed to the spacer main body 41 with a connecting method such as a surface-contact fastener 69A. The connecting method in which the extended cover portion 69 is connected to the spacer main body 41 is not limited to the surface-contact fastener 69A but may be altered if necessary.

Thus, the extended cover portion 69 is connected to an end portion of the lower surface cover portion 66 close to the compartment outer side and is also attached to the spacer main body 41. With this configuration, if the pad main body 51 receives a load that causes the pad main body 51 to be displaced or deformed upwardly, the pad main body 51 is supported by two components of the compartment inner side extended portion 65 (and the compartment outer side extended portion 68) and the extended cover portion 69, as illustrated in FIG. 5. Accordingly, the pad main body 51 is much less likely to be displaced or deformed upwardly.

Next, advantageous effects of the present embodiment will be explained. In the shock absorber assembly of the present embodiment, the shock absorber pad 50 is mounted to the door trim 10 that is mounted on the compartment inner side of the door inner panel 11. The shock absorber assembly includes the shock absorber pad 50, the flexible member 60, and the spacer 40. The flexible member 60 covers most of the surfaces of the shock absorber pad 50. The spacer 40 is mounted to the compartment outer side surface 30A of the lower board 30 (the door trim 10). The shock absorber pad 50 is directly mounted to the compartment outer side surface 30A of the lower board 30 via the mounting portions 52. This fixes the shock absorber pad 50 to the lower board 30 and the shock absorber pad 50 does not move with respect to the lower board 30. A part of the flexible member 60 is sandwiched and held between the lower board 30 and the spacer 40 and accordingly, the shock absorber pad 50 is indirectly mounted to the lower board 30 via the flexible member 60.

In the present embodiment, most of the surfaces of the pad main body 51 (the shock absorber pad 50) is covered with the flexible member 60 and apart of the flexible member 60 is sandwiched and held by the lower board 30 and the spacer 40. Accordingly, the pad main body 51 is supported by the flexible member 60 and the flexible member 60 is fixed to the lower board 30 and the spacer 40. Thus, the shock absorber pad 50 is supported by the lower board 30 indirectly via the flexible member 60, and the spacer 40 and the shock absorber pad 50 are integrally mounted to the lower board 30 by the flexible member 60. With this configuration, if the shock absorber pad 50 receives a load due to a side collision, the shock absorber pad 50 is less likely to move from its initial mounting position. Accordingly, the shock absorber pad 50 is kept in an appropriate position corresponding to the passenger's thigh.

The shock absorber pad 50 is mounted to the door trim 10 also by the flexible member 60 having flexibility. With this configuration, the shock absorber pad 50 is less likely to be deformed compared to a configuration in which the shock absorber pad 50 is fixed by a member having high rigidity. Therefore, the shock absorbing property of the shock absorber pad 50 is less likely to be deteriorated. Further, a part of the flexible member 60 is sandwiched and held by the lower board 30 and the spacer 40, and therefore an exclusive member for supporting the flexible member 60 is not required.

The flexible member 60 covers a substantially entire peripheral surface of the pad main body 51 and supports the pad main body 51. Thus, the pad main body 51 is supported by the flexible member 60 with a large area. With this configuration, compared to a configuration without including the flexible member 60, a stress is less likely to be concentrated on the vicinity of the mounting portion 52 of the shock absorber pad 50 if a load is applied to the shock absorber pad 50 and deformation of the mounting portion 52 is less likely to be caused.

In the above configuration, the flexible member 60 includes the extended cover portion 69 that is provided between the compartment inner side surface 11A of the door inner panel 11 and the compartment outer side surface 41A of the spacer 40.

According to the present embodiment, if the door inner panel 11 is displaced or deformed toward the compartment inner side due to a load caused by a side collision (a load applied from the compartment outer side), the extended cover portion 69 is sandwiched and held by the door inner panel 11 and the spacer 40. Accordingly, the flexible member 60 is held more firmly with a great force and the shock absorber pad 50 is further less likely to be displaced or deformed upwardly. Therefore, the flexible member 60 surely supports and holds the shock absorber pad 50.

The projection boss 32 projecting to the compartment outer side is formed on the compartment outer side surface 30A of the lower board 30. The flexible member 60 includes the compartment inner side extended portion 65 and the compartment outer side extended portion 68 that are mounted on the compartment outer side surface 30A of the lower board 30. The compartment inner side extended portion 65 has the insertion hole 65A and the compartment outer side extended portion 68 has the insertion hole 68A. The projection boss 32 is inserted through the insertion hole 65A and the insertion hole 68A. The spacer 40 has the insertion hole 47 through which the projection boss 32 is inserted. The spacer 40 further includes the mounting portion 46A that is mounted to the compartment outer side surface 30A of the lower board 30. The mounting portion 46A is provided to cover the compartment inner side extended portion 65 and the compartment outer side extended portion 68 from the compartment outer side. The projection boss 32 is inserted from the compartment inner side through the insertion hole 65A, the insertion hole 68A, and the insertion hole 47 and then, the distal end portion 32A of the projection boss 32 is fixed to the mounting portion 46A by welding. The distal end portion 32A of the projection boss 32 is fixed to the mounting portion 46A by welding and accordingly, the compartment inner side extended portion 65 and the compartment outer side extended portion 68 are sandwiched and held by the mounting portion 46A and the lower board 30.

According to the present embodiment, the distal end portion 32A of the projection boss 32 is fixed to the mounting portion 46A by welding and accordingly, the compartment inner side extended portion 65 and the compartment outer side extended portion 68 are sandwiched and held by the mounting portion 46A and the lower board 30. With this configuration, the flexible member 60 is fixed to the lower board 30 more firmly. The compartment inner side extended portion 65, the compartment outer side extended portion 68 and the mounting portion 46A are mounted to the projection boss 32. With this configuration, the flexible member 60 and the spacer 40a are collectively mounted to the lower board 30 and this improves operability.

The spacer 40 is provided to face the side surface portion 18A of the seat 18 that is arranged on the compartment inner side of the lower board 30. The spacer 40 presses the side surface portion 18A in case of a side collision and accordingly, the load caused by the side collision is transmitted to the seat 18.

According to the present embodiment, a part of the flexible member 60 (the compartment inner side extended portion 65 and the compartment outer side extended portion 68) is sandwiched and held by the lower board 30 and the spacer 40. With this configuration, if the spacer 40 is pressed by the side surface portion 18A of the seat 18 in case of a side collision, a part of the flexible member 60 is firmly held by the compartment outer side surface 30A of the lower board 30 and the bottom wall 42 of the spacer 40. Accordingly, the shock absorber pad 50 is held more firmly in case of the side collision.

The spacer 40 includes the reinforcing ribs 43, 45 and has high rigidity. A part of the flexible member 60 is held by such a high rigidity member and accordingly, the flexible member 60 is surely fixed by the lower board 30 and the spacer 40.

Other Embodiments

The present invention is not limited to the embodiment as described above with reference to the drawings. For example, the present invention may include following embodiments.

(1) In the above embodiment, the door trim 10 is an example of the vehicular interior part. However, it is not limited thereto. A pillar trim or a back door trim may be an example of the vehicular interior part and a panel member to which each of the vehicular interior parts is mounted may be an example of the vehicular body panel.

(2) In the above embodiment, the spacer 40 is an example of a utility part. However, it is not limited thereto. Any one of utility parts that are provided to the trim board 12 other than the shock absorber pad 50 may be an example of the utility part. A door pocket of a speaker grill may be an example of the utility part. For example, a part of the door pocket or the speaker grill may be extended and the flexible member 60 may be held by the extended portion and the trim board 12.

(3) A method of covering the shock absorber pad 50 by the flexible member 60 may not be limited to the above embodiment. Namely, the surface portions of the shock absorber pad 50 that are covered with the flexible member 60 are not limited to the portions described in the above embodiment. As long as the flexible member 60 covers and supports the shock absorber pad 50, the portions of the shock absorber pad 50 covered with the flexible member 60 may be altered if necessary. For example, the flexible member 60 may cover only side surfaces and upper surface of the pad main body 51 of the shock absorber pad 50 to support the shock absorber pad 50.

(4) A material of the flexible member 60 is not limited to fibers but may be altered if necessary. For example, the flexible member 60 is made of a film.

(5) The shock absorber pad 50 is not necessarily formed in the shape described in the above embodiment but may be altered if necessary.

(6) The shock absorber pad 50, the spacer 40, and the flexible member 60 are not necessarily fixed to the lower board 30 by heat welding. For example, the shock absorber pad 50, the spacer 40, and the flexible member 60 may be fixed to the lower board 30 by a screw.

What is claimed is:
1. A shock absorber assembly comprising:
a shock absorber mounted to a vehicular interior part, the vehicular interior part being mounted on a compartment inner side of a body panel, the shock absorber including a mounting portion and a peripheral surface, the mounting portion being mounted to a compartment outer side surface of the vehicular interior part and the peripheral surface extending around the shock absorber from the compartment inner side of the body panel to the compartment outer side surface of the vehicular interior part;
a utility part mounted to the compartment outer side surface of the vehicular interior part; and
a flexible member covering the peripheral surface of the shock absorber, the flexible member, a part which is held by the vehicular interior part and the utility part at the compartment outer side surface of the vehicular interior part, is configured to support and mount the shock absorber to the vehicular interior part.

2. The shock absorber assembly according to claim 1, wherein
the shock absorber includes a pad main body and the mounting portion is provided on the pad main body,
the mounting portion of the shock absorber has a through hole that is fitted to a projection extending from the vehicular interior part, and
the pad main body of the shock absorber is supported by the flexible member and mounted to the vehicular interior part via the flexible member.

3. The shock absorber assembly according to claim 1, wherein the flexible member is provided between a surface of the body panel close to the compartment inner side and a surface of the utility part close to the compartment outer side of the vehicular interior part.

4. The shock absorber assembly according to claim 2, wherein
the pad main body a compartment outer side surface facing the compartment inner side of the body panel and a compartment inner side surface facing the compartment outer side of the vehicular interior part, and
the flexible member is a sheet-like shape provided to cover the compartment outer side surface and the compartment inner side surface of the pad main body.

5. The shock absorber assembly according to claim 2, wherein the flexible member is a sheet-like shape and provided to substantially cover the pad main body of the shock absorber.

6. The shock absorber assembly according to claim 2, wherein
the shock absorber and the utility part are adjacent to each other,
the flexible member is a sheet-like shape having a folded portion at a side of the shock absorber that is away from the utility part configured such that the flexible member defines a folded space in which the pad main body is provided,
the flexible member has two end portions that are provided at a side opposite to the folded portion and the two end portions are overlapped with each other and provided to cover a surface of the utility part facing the compartment outer side of the vehicular interior part, and
the two end portions have distal end portions, respectively, that are held by the vehicular interior part and the utility part.

7. The shock absorber assembly according to claim 6, wherein the flexible member is provided on a side of the utility part facing the compartment outer side of the vehicular interior part.

8. The shock absorber assembly according to claim 6, wherein the shock absorber and the utility part are mounted to the vehicular interior part via the flexible member.

9. The shock absorber assembly according to claim 6, wherein
the pad main body is a prism shape having two base surfaces and at least three side surfaces, and the two base surfaces including a compartment outer side surface facing the compartment inner side of the body panel and a compartment inner side surface facing the compartment outer side of the vehicular interior part, and the at least three side surfaces include one side surface facing the utility part, and
the two base surfaces and the one side surface and a second side surface that is opposite to the one side surface are covered by the flexible member.

10. The shock absorber assembly according to claim 9, wherein the pad main body is substantially a triangular prism shape.

11. The shock absorber assembly according to claim 9, wherein the mounting portion includes a plurality of mounting portions each of which is generally provided at a corner of one of the base surfaces.

12. The shock absorber assembly according to claim 1, wherein
the vehicular interior part has a projection boss on the compartment outer side surface, and the projection boss projects toward the compartment outer side,
the flexible member has a flexible member insertion hole through which the projection boss projects and has a flexible member mounting portion that is provided on the compartment outer side surface of the vehicular interior part,
the utility part has a utility part insertion hole through which the projection boss projects and has a utility part mounting portion that is provided on the compartment outer side surface of the vehicular interior part,
the utility part mounting portion is provided to cover the flexible member mounting portion from the compartment inner side of the body panel,
the projection boss projects through the flexible member insertion hole and the utility part insertion hole from the compartment inner side and a distal end portion of the projection boss is fixed to the utility part mounting portion, and
the distal end portion of the projection boss is fixed to the utility part mounting portion so that the flexible member mounting portion is held by the utility part mounting portion and the vehicular interior part.

13. The shock absorber assembly according to claim 1, wherein
the body panel is a vehicular door panel,
the vehicular interior part is a vehicular door trim, and
the utility part is a spacer that is provided between the vehicular door panel and the vehicular door trim so as to correspond to a side surface of a seat, wherein
when a load caused by a side collision occurs, the spacer is configured to press the side surface of the seat so that the load is transferred to the seat.

14. The shock absorber assembly according to claim 1, wherein the shock absorber and the utility part are mounted to the vehicular interior part via the flexible member.

15. The shock absorber assembly according to claim 2, wherein the shock absorber and the utility part are mounted to the vehicular interior part via the flexible member.

* * * * *